June 24, 1930.  J. JOHNSON  1,767,078

SCREEN FOR FILTER PRESSES

Filed Nov. 29, 1927

INVENTOR
John Johnson,
BY
George D Richards
ATTORNEY

Patented June 24, 1930

1,767,078

UNITED STATES PATENT OFFICE

JOHN JOHNSON, OF MAPLEWOOD, NEW JERSEY

SCREEN FOR FILTER PRESSES

Application filed November 29, 1927. Serial No. 236,450.

This invention relates to improvements in filtering screens for filter presses of various kinds including hydraulic types.

The invention has for its principal object to provide a novel construction of filter screen adapted to provide a maximum of active filtering area while at the same time being practically self-cleaning.

The invention has for a further object to provide a strong, durable and highly efficient composite filter screen structure, the same comprising, preferably, a fine wire-cloth filter sheet overlaid upon a relatively heavy backing screen formed by coarse woven wire mesh, corrugated perforate sheet metal or similar structure; said filter sheet and backing screen being secured together by imbedding the margins of the same in a cast or molded peripheral binding which is adapted to fit snugly and smoothly into the screen seats of a filter press chamber so as to eliminate leakage around the edges of the screens when in use, thereby assuring a cleaner filtrate, while at the same time providing a structure of unitary form well calculated to maintain its shape and operative condition both during service within a press as well as when removed therefrom and handled as necessity may from time to time require.

Other objects of this invention, not at this time more particularly enumerated, will be clearly understood from the following detailed description of the same.

The invention is illustrated in the accompanying drawings, in which:—

Figure 1:
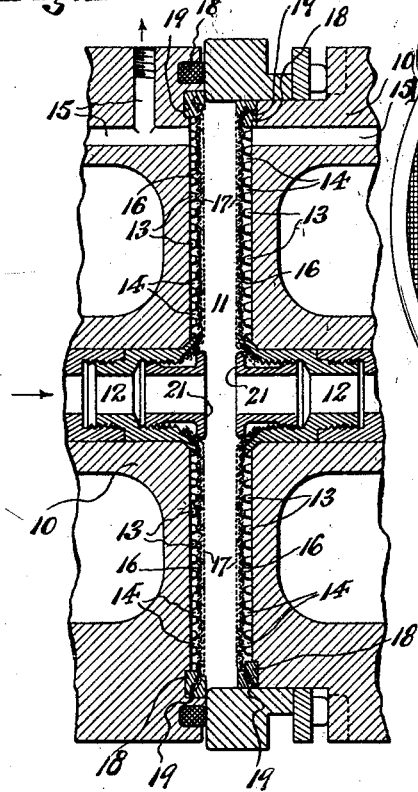
Figure 2:
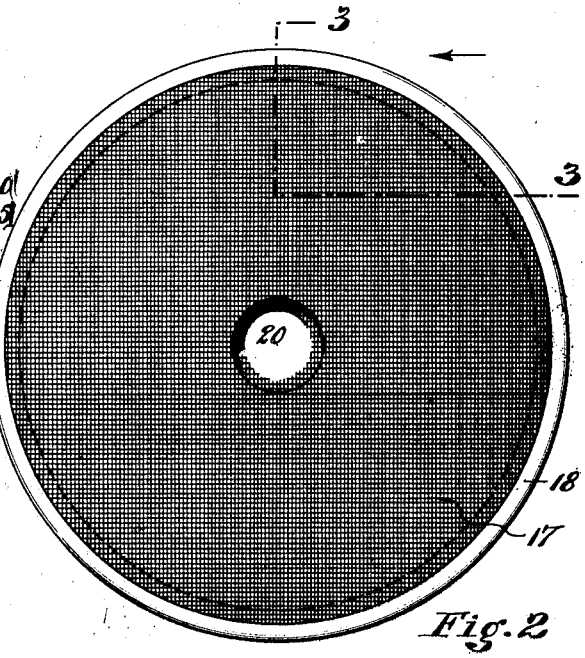
Figure 5:
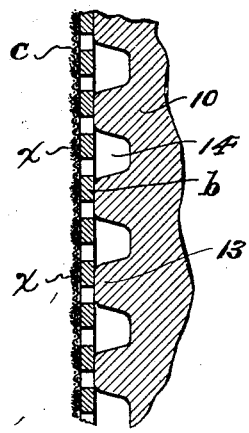
Figures 3, 4:
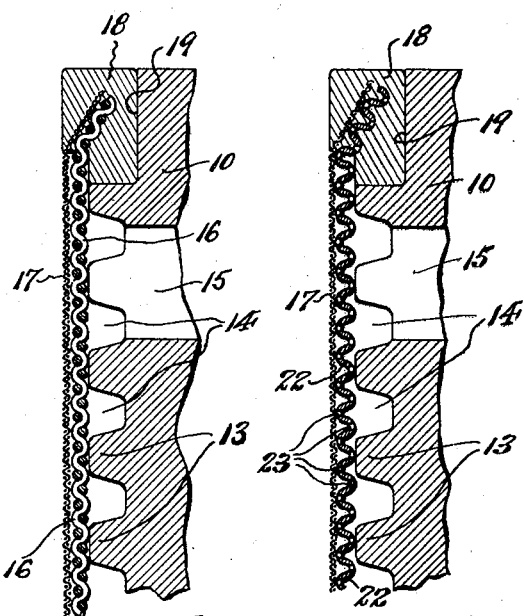

Figure 1 is a fragmentary vertical section of a typical filter press equipped with one form of the novel improved filter screen made according to and embodying the principles of the present invention; Figure 2 is a face view of said form of filter screen; Figure 3 is a fragmentary vertical section through the screen on line 3—3 in Figure 2 viewed in the direction of the arrow, but drawn on an enlarged scale; Figure 4 is a view similar to that shown in Figure 3, but illustrating a modified form of backing screen member; and Figure 5 is a diagrammatic sectional view illustrating the usual manner of backing filter cloths to show the loss of effective filtering area entailed thereby for comparison with and to more clearly demonstrate the efficiency of the filter screen structure of the instant invention.

Similar characters of reference are employed in the above described views, to indicate corresponding parts.

While the novel filtering screen structures of this invention may be used to advantage in various types of filter press mechanisms, for the purpose of illustration I have shown (in Figure 1) the same applied to an hydraulic filter press of the general character disclosed in my prior United States Letters Patent #1,139,767, in which opposed filter plates 10 bound an intermediate filter chamber 11, said plates 10 having central inlet passages 12 through which the material to be filtered and pressed is introduced into said filter chamber 11. The faces of said plates 10 which bound the filter chamber 11 are provided with a multiplicity of spaced apart, preferably pyramidal, bosses 13 to form reticulate channels 14 communicating with filtrate discharge passages 15 with which said filter plates 10 are also provided.

It has heretofore been the practice to apply across the channeled faces of the filter plates 10 a filter cloth usually comprising a woven wire cloth of very fine mesh $c$, the same being supported by a flat perforate backing sheet $b$ (see Figure 5), the cloth $c$ being bent or folded around the margins of said backing sheet $b$. Such arrangement has been found to be very unsatisfactory; first, for the reason that the unfiltered material would leak around the peripheral edges of the screen thus formed, and, second, because solids would collect and clog the portions of the cloth contiguous to the imperforate portions of the backing sheet, as indicated at $x$ in Figure 5, thus quickly cutting down the effective filtering area of the cloth, e. g., as the imperforate portions of said backing sheet approximated 75 per cent of the total area thereof, it follows that the effective filtering area of the cloth was reduced to approximately 25 per cent of its total area. It will be obvious that the use of this old arrangement of filter cloth and backing involved necessity for frequent removal and cleaning of the filter screens, with consequent wear and tear on the screens and loss of time in the use of the filter press, all of which increased the cost of operation of the latter.

It is the primary object of this invention to provide in combination with a filter cloth a novel construction of backing means which is calculated to furnish a firm support while at the same time reducing to a minimum blocking of the cloth interstices and resultant clogging, and also rendering the filter screen self-cleaning to a very considerable degree. To this end I provide a structure comprising a substantially rigid permeable backing sheet having a roughened surface in contact with the filter cloth whereby, although a firm backing support is furnished to the cloth, nevertheless a maximum amount of clearance space occurs intermediate the cloth and backing sheet so that the filtrate may readily penetrate the former and whereby tendency to blocking of the interstices of the cloth is eliminated. One form of backing sheet possessing the desired characteristics consists in a substantially rigid foraminous or mesh sheet 16 woven from relatively heavy wire, which provides a multiplicity of openings through which the filtrate can escape while at the same time furnishing a multiplicity of uniformly spaced apart nodular projections tangent to the filter cloth but affording intermediate and around the same the desired clearance spaces with which the interstices of the filter cloth communicate. In practice the relatively coarse woven wire mesh backing sheet 16 is engaged against the free ends of the bosses 13 of the filter plates 10 and the fine wire mesh filter cloth 17 is overlaid upon this backing sheet 16, all as shown in Figures 1, 2 and 3 of the drawings. In order to secure the filter cloth 17 and backing sheet 16 in operative assembled relation to provide a unitary filter screen member, the margins of the assembled cloth and sheet are imbedded in a cast or molded peripheral binding 18, preferably consisting of lead or other suitable metal, or in some cases the binding 18 may be made of rubber or other suitable form of plastic material, either hard or resilient as may be desired. The peripheral binding 18 not only binds the filter cloth 17 and backing sheet 16 together in operative relation to form a unitary structure, but also provides a tight joint making element when engaged in a smooth machined groove or seat 19 (see Figure 1) with which the filter plates 10 may be provided to receive the same thus producing a leak-tight joint between the margins of the filter screens and the filter plates with which they are associated, so as to prevent the solids of the material being filtered from escaping around the peripheries of the filter screens. If the filter press with which the novel filter screens are to be employed possess central inlets leading to the filter chambers 11, the screens are provided with central openings 20 (see Figure 2) the margins of which may be engaged and bound to the filter plates 10 around the inlet passages 12 by the tubular clamp-nuts 21, in the manner shown in Figure 1 of the drawings.

I have shown in Figure 4 of the drawings a modified form of backing sheet for the novel filter screen structure which I deem equivalent to the coarse wire mesh form above described, but which comprises a corrugated or embossed metal plate 22 the peaks or convexities of the corrugations or ribs of which bear against the surface of the overlaid filter cloth 17 so as to support the same, while also providing intermediate the corrugations or ribs the clearance spaces with which the interstices of the filter cloth may communicate. The corrugated or embossed plate 22 is provided with a multiplicity of perforations 23 throughout the area thereof to permit the outward passing therethrough of the filtrate to the reticulate channels in the faces of the filter plates 10. The corrugated or embossed perforate backing plate 22 and filter cloth 17 when assembled together may also be bound into a unitary filter screen member by imbedding the margins thereof in a cast or molded peripheral binding 18, such as already above described.

It will be understood that the span or distance between the wires of woven mesh form of backing sheet, or the span or distance between the peaks or convexities of the corrugations or bosses of the plate form of backing sheet is considerably less than the distance separating the bosses 13 of the filter plates 10, so that the fine mesh wire filter cloth of the screens is adequately braced and supported over the channels 14 of the filter plates 10 without being subjected to undue strains.

From the above description it will be obvious that, due to the tangential multiple point contact of the backing sheet relative to the filter sheet and the resultant formation of clearance spaces around such points of contact and intermediate the sheets, that the filter screen structure is self-cleaning to a large degree, since building up of solids against impermeable areas with consequent clogging of the interstices of the filter sheet is substantially entirely prevented.

In the broader aspects of my invention I do not limit myself to the use of the cast or molded peripheral binding 18, since other forms of binding to securely unite the filter and backing sheets may be employed; or when the filter and backing sheets are employed in filter presses having means to clamp the margins of the filter screens said binding may be entirely omitted.

As many changes could be made in the above described constructions and many widely different embodiments of this invention could be made without departing from the scope thereof, it is intended that all matter contained in the above description or shown in the accompanying drawings shall be interpreted as illustrative and not in a limiting sense.

I claim:

1. A filter press screen, comprising a fine mesh filter cloth, a substantially rigid woven mesh backing sheet of relatively heavy wire underlying said filter cloth, the marginal portions of said superimposed sheets being inclined rearwardly from the plane thereof, and a molded peripheral binding in which the inclined margins of said assembled cloth and backing sheet are imbedded to provide a substantially rigid unitary screen structure, with the forward face of said binding disposed substantially in alignment with the forward face plane of said screen and the rear portion of said binding being off-set from the rear face plane of said screen to provide a packing ring portion.

2. A filter press screen, comprising a fine mesh filter cloth, a permeable means to back said cloth, the marginal portions of said assembled cloth and backing means being inclined rearwardly from the plane thereof, and a molded peripheral binding in which the inclined margins of said assembled filter cloth and backing means are imbedded to provide a substantially rigid unitary screen structure, with the forward face of said binding disposed substantially in alignment with the forward face plane of said screen and the rear portion of said binding being off-set from the rear face plane of said screen to provide a packing ring portion.

In testimony, that I claim the invention set forth above I have hereunto set my hand this 25th day of November, 1927.

JOHN JOHNSON.